June 5, 1956  H. C. BROWN  2,748,474
COMBINED SCRIBING AND EYE-PROTECTING OPTICAL SYSTEM
Filed Aug. 27, 1954
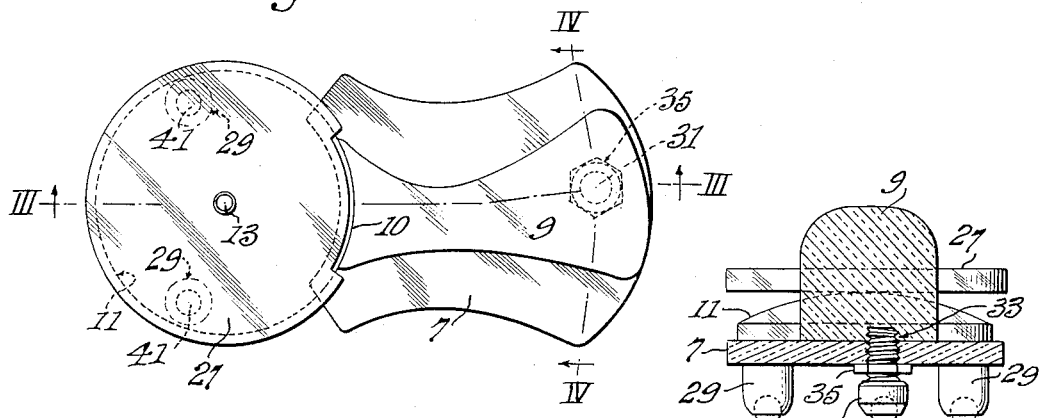
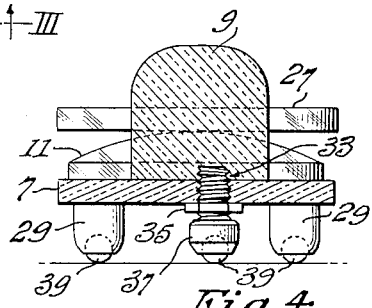
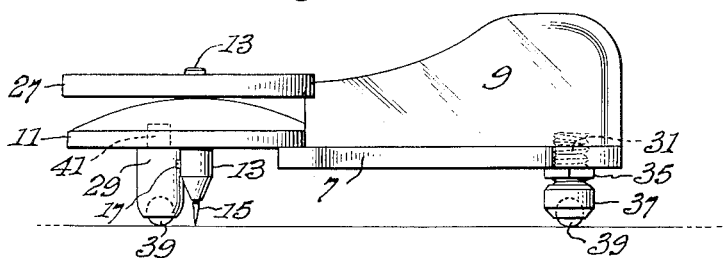
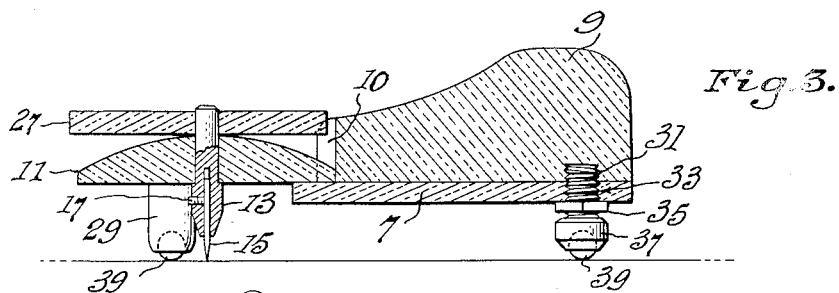
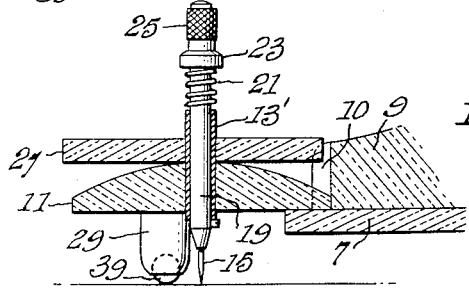
INVENTOR.
Harry C. Brown
BY
ATTORNEYS

United States Patent Office 2,748,474
Patented June 5, 1956

2,748,474

COMBINED SCRIBING AND EYE-PROTECTING OPTICAL SYSTEM

Harry C. Brown, San Antonio, Tex.

Application August 27, 1954, Serial No. 452,740

4 Claims. (Cl. 30—164.9)

(Granted under Title 35, U. S. Code (1952), sec. 266)

The invention described herein may be manufactured and used by or for the Government for governmental purposes, without payment to me of any royalty thereon.

The present invention provides improvements in scribing or engraving instruments which are adapted particularly to the scribing or engraving of maps, and particularly contour maps, in rather soft materials such as synthetic "plastics."

The recent trend of the mapping industry is to accomplish map color-separation engraving on a stable, transparent synthetic "plastic" (vinyl) material rather than on glass. The present invention provides an improved construction of an engraving instrument or scriber which meets the requirements for engraving various map features such as relief lines, drainage, shorelines, roads and trails (required to be shown by single lines), map projections, and various military grids.

More particularly, one object of the present invention is to provide an improved engraving instrument which enables an operator to engrave the various map features without danger of scratching or scarring the surface of the plastic material being engraved, thereby assuring the production of work of high quality as well as maximum productivity.

A further object of the invention is to provide an instrument of the above-indicated character wherein the operator is assisted optically by mounting the engraving tool in a magnifying lens at the center or vertical axis of the lens, and additionally mounting a tinted or colored transparent flat disc or plate immediately above the magnifying lens, thereby reducing eye strain and eye fatigue, such tinted member being composed of variously colored plastic material which may be interchanged readily, the particular color of which is selected in accordance with the color of the plastic (vinyl) material being engraved.

Further objects and advantages of the present invention will become apparent as the description proceeds and the features of novelty will be pointed out in particularity in the appended claims.

The invention will be understood more readily by reference to the accompanying drawings, in which Fig. 1 is a plan view of an engraving tool embodying the improvements of the present invention;

Fig. 2 is a side elevation thereof;

Fig. 3 is a longitudinal vertical section taken on the line III—III of Fig. 1, looking in the direction of the arrows;

Fig. 4 is a transverse vertical section taken on the line IV—IV of Fig. 1, looking in the direction of the arrows; and Fig. 5 is a fragmentary vertical section generally similar to Fig. 3, but showing a modified engraving stylus and mounting therefor.

Referring more particularly to the drawings, the instrument embodying the improvements of the present invention includes a substantially planar base 7 which is composed preferably of a transparent plastic material, such as a vinyl plastic, and which may be colored or tinted with a transparent color or tint that will tend to alleviate eye strain of an operator. The instrument is manipulated manually by the operating engraver by providing a convenient handle portion or hand-grip element 9, which is integral with the base 7 and which has been molded or shaped otherwise into a contour convenient to a manual grasp by the operator. Rigidly and permanently mounted on the forward end of the base 7 and peripherally in an arcuate recess 10 in the forward end of the grip element 9 is a magnifying lens 11 of substantial diameter which extends forwardly from the base 7 and which is sufficiently large and convex so that the engraver views his work through this lens and obtains a sufficient magnification of the work to assure accurate production of details of the work.

Mounted vertically and permanently in the magnifying lens 11 at the vertical axis thereof is the scribing assembly, which comprises a stylus holder 13, the lower end of which is recessed for receiving an engraving stylus 15 held by a set screw 17, the remainder of the holder being a solid spindle as indicated in Fig. 3, for example, or, as shown in Fig. 5, the holder 13' may be a tubular metallic sleeve for receiving a spindle 19, in which the engraving stylus 15 is mounted, and which is vertically slidable in the sleeve responsive to the engraver sufficiently compressing a coil compression spring 21 which seats between the top end of holder 13 and a collar 23 adjacent to the top end of this spindle 19, this latter having a knurled operating head 25 for convenient manipulation of the spindle 19.

In either form of the instrument illustrated in the drawings, the holder 13 or 13' extends beyond the top surface of the magnifying lens 11 to receive and to form a mounting for a transparent plastic guard member such as a plate or disc 27 which has substantially planar top and bottom surfaces, and which may rest upon the top surface of the magnifying lens or positioned thereabove in juxtaposition thereto, and which is substantially equal in area or extent to that of the lens 11 and which, like lens 11, may extend peripherally into the arcuate recess 10 in the forward end of the grip member 9 of the instrument. The operator views his work through this transparent plastic planar guard member 27 as well as through the magnifying lens 11, and the member 27 although transparent, preferably may be colored or tinted with a transparent coloring selected for reducing eye-strain or eye-fatigue on the part of the operator. This tinted guard member or disc 27 may be made in variously colored plastic material and desirably it is mounted removably for replacement readily with other similar elements or discs of different selected colors or tints, the color being determined by the color of the plastic (vinyl) surface being engraved.

Additionally, the instrument is stabilized with respect to the surface being engraved by providing a three-point (tripod or triangular) mounting, there being provided a pair of mounting legs forwardly of, and beneath the magnifying lens, which pair of legs, designated at 29, are identical to each other and are spaced oppositely to each other adjacent to the periphery of the lens, and at equal distance from the sides of the forward end of the base. The third leg of the three-point mounting, designated at 31, is positioned beneath the handle or grip element 9 and is centered near the rear thereof, this mounting leg 31 being at the apex of an isosceles triangle at the other opposite corners of which are the mounting legs 29. The leg 31 is threadedly adjustable in the base 7 and handle 9, as is indicated at 33, and by requisite leveling adjustments of this leg 31 the instrument may be leveled relative to the surface being engraved, and releasably held in such level position by a lock nut 35 on the said leg 31 and intermediate the bottom planar surface of base 7 of the instrument and an abutment collar 37 on the bottom end of this rear leg 31. An anti-friction bearing, illustrated as a ball-bearing 39, is mounted rotatably in the bottom ends of each of the mounting legs, these ball-bearings being of substantially equal size and secured freely in all directions in the bottom ends of each leg, so as to be rotatable in accordance with movements of the instrument in any direction on the plastic (vinyl) surface being engraved, thus enabling the instrument to be manipulated readily in any desired direction on the surface being engraved without danger of such surface becoming scratched or marred because of such manipulations. The anti-friction bearings 39 are freely turnable in all directions as aforesaid, they being freely rotatable in retaining sockets provided therefor in the ends of the mounting legs, such sockets being formed in a usual manner, as by providing a recess in the lower end portions of the legs for receiving the ball-bearings, and loosely crimping the peripheries of the sockets around the ball-bearings beyond the largest diameters of the latter so that the ball-bearings are retained loosely in such end sockets. It will be apparent that the mounting legs 29 and 31 are composed of any soft metal, such as brass, the forward legs 29 having restricted top stud portions 41 that are received and held frictionally in holes provided therefor in the lens 11, the adjustable rear leg 31 being threaded directly in the plastic material of the base 7 and into the handle element 9.

It will be observed that important features of the present construction are in the provision of the equalized three-point mounting for the instrument including adjustable leveling means, and the provision of universally movable anti-friction bearing means on the bottom end of each mounting, which means engage the surface being engraved and enable the engraver to manipulate the present instrument in any direction upon a plastic surface being engraved without danger of scratching or scarring of such surface, thus facilitating the obtaining of work of high quality as well as maximum productivity. The interchangeable colored disc or eye-protective plate surmounting the magnifying lens enables the use of such a protective element of any selected color which is restful to the operating engraver's eyes, the color selected being determined by the color of the plastic (vinyl) surface being engraved. In furtherance of this eye protection, the base of the instrument may be manufactured in a similar restfully colored transparent plastic without any substantial diminution of transparency of the base, permitting an operator with normal vision to define map features or other details of the work being reproduced without impairment of visibility thereof.

It will be understood that the foregoing description and accompanying drawings set forth the preferred structural embodiment of the present improved instrument, but it will be apparent also that various structural details may be altered or modified without departing from the concept of the invention and without loss or impairment of the advantages present in the construction; and it will be understood, therefore, that it is intended and desired to embrace within the scope of the invention such modifications and changes as may be necessary or desirable to adapt the present construction to various conditions and uses, as defined by the appended claims.

Having thus described my invention, what I claim as new and wish to secure by Letters Patent is:

1. An engraving instrument for engraving single line map details in a transparent colored surface composed of a synthetic plastic material, which comprises, in combination, a base, a handle element on the base adapted to be grasped manually by an engraving-operator, a magnifying lens mounted on the base at a selected distance above a work-surface being engraved, the lens extending forwardly from the base and affording an unobstructed view of the work-surface, an engraving tool assembly mounted in the lens and including an engraving stylus having an engraving point adapted to engage with the work-surface, the said lens providing an enlarged image of the stylus point and adjacent areas of the work-surface to an operator viewing the stylus and work-surface through the lens, and a protective substantially planar transparent eye-shield juxtaposed above the lens and in axial alignment therewith, the said shield having an area at least approximately equal to that of the lens, whereby the lens and its enlarged image are viewed through the shield by an engraving-operator.

2. An engraving instrument for engraving a colored work-surface, comprising a base, a handle element on the base adapted to be grasped manually by an engraving operator, a magnifying lens supported by the base at a selected distance above the colored work-surface being engraved, the lens extending forwardly from the base and having a convex upper surface, an engraving tool assembly including a sleeve element projecting vertically centrally through the lens and an engraving stylus mounted in the sleeve element adapted to engage the work-surface, the lens being secured permanently to the sleeve element and also to the base and to the handle element at corresponding peripheral portions of the lens, the said lens affording an unobstructed and magnified view of the stylus and portions of the work-surface underlying the lens to an operator viewing the stylus and work-surface through the lens, and a substantially planar, transparent, protectively-colored eye-shield removably mounted on the sleeve element and juxtaposed above the lens in axial alignment therewith and including a transparent eye-protecting pigment of a color selected in accordance with the color of the work-surface being engraved for protecting the engraving-operator against eye-strain and eye-fatigue, the transparent colored eye-shield having an opening therethrough somewhat larger in diameter than the sleeve element for removably mounting the shield on the sleeve element in engagement with the convex surface of the lens for enabling free removal of the shield from the sleeve element for free exchange of the shield with another similar transparent shield having a selected different eye-protecting pigmentation in accordance with a particular different color of the work-surface being engraved.

3. An engraving instrument for engraving a colored work-surface, which comprises, in combination, a base, a handle element on the base adapted to be grasped and held manually by an engraving-operator, a magnifying lens supported by the base at a selected distance above the work-surface, the lens extending forwardly with respect to the base and affording an unobstructed magnified view of the work-surface, an engraving tool assembly mounted in the lens and including a sleeve element permanently secured in the lens axially thereof, and an engraving stylus carried by the sleeve element, the stylus having an engraving point adapted to engage the work-surface, the said lens providing an enlarged image of the stylus point and adjacent areas of the work-surface to an operator viewing the stylus and work-surface through the lens; and a protective, substantially planar, transparent eye-shield mounted on the sleeve element above the lens and adjacent thereto and in axial alignment with the lens, the said shield being transparently pigmented with a transparent color uniformly distributed throughout the shield as an eye-protecting pigment selected in conformity with the coloring of the work-surface being engraved, the said shield having an area at least approximately equal to that of the lens, whereby the lens and its enlarged image are viewed through the shield by an engraving operator, the shield having an opening extending therethrough of a somewhat larger diameter than the sleeve element for removably mounting the shield on the sleeve element having a different eye-protective coloring determined by a different color of the work-surface being engraved.

4. An engraving instrument which comprises in combination, a base, a handle element on the base adapted to be grasped and held manually by an engraving operator; a magnifying lens supported by the base at a selected distance above the work-surface and positioned relative to the base for affording an unobstructed magnified view of the work-surface, an engraving tool assembly carried by the lens and including a mounting element operably associated with the lens, and an engraving stylus carried by the mounting element, the stylus having an engraving point adapted to engage the work-surface, the lens providing an enlarged image of the stylus point and adjacent areas of the work-surface to an operator viewing the stylus and work-surface through the lens; and a protective, substantially planar transparent eye-shield carried by the base and adjacent to the lens, the lens and its enlarged image being visible through the shield to an engraving operator, and mounting means for the shield enabling removal of the shield for replacement of the shield by another shield when so desired.

References Cited in the file of this patent

UNITED STATES PATENTS

| | | |
|---|---|---|
| 416,003 | Logan | Nov. 26, 1889 |
| 478,787 | Croom | July 12, 1892 |
| 2,178,755 | Johnson | Nov. 7, 1939 |
| 2,245,116 | Rhatigan | June 10, 1941 |
| 2,362,992 | Dentzler | Nov. 21, 1944 |
| 2,394,452 | Howard | Feb. 5, 1946 |
| 2,426,480 | Wood | Aug. 26, 1947 |
| 2,455,972 | Bowditch | Dec. 14, 1948 |
| 2,497,418 | Schroeder | Feb. 14, 1950 |